US006456452B1

United States Patent
Hobson et al.

(10) Patent No.: US 6,456,452 B1
(45) Date of Patent: Sep. 24, 2002

(54) FEED FORWARD COMPENSATION FOR REPEATABLE HEAD POSITION ERROR IN A DISC DRIVE

(75) Inventors: Daniel E. Hobson, Yukon; Philip R. Woods, Oklahoma City, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/522,839

(22) Filed: Sep. 1, 1995

(51) Int. Cl.[7] ............................................. G11B 5/596
(52) U.S. Cl. ................................. 360/78.07; 360/77.04
(58) Field of Search ............................... 360/70, 78.07, 360/78.08, 77.04–77.08, 73.03, 73.11, 73.12, 75, 78.09, 77.02, 78.04

(56) References Cited

U.S. PATENT DOCUMENTS

| 4,103,314 A | | 7/1978 | Case ............................ 360/78 |
| 4,136,365 A | * | 1/1979 | Chick et al. ............. 360/78.05 |
| 4,594,622 A | | 6/1986 | Wallis .......................... 360/77 |
| 4,616,276 A | * | 10/1986 | Workman ................. 360/77.04 |
| 4,628,379 A | | 12/1986 | Andrews, Jr. et al. |
| 4,969,059 A | * | 11/1990 | Volz et al. ............... 360/77.04 |
| 5,072,318 A | * | 12/1991 | Yu ............................ 360/77.02 |
| 5,262,907 A | | 11/1993 | Duffy et al. ................ 360/77.5 |
| 5,305,159 A | * | 4/1994 | Sakai et al. .......... 360/77.04 X |
| 5,305,160 A | | 4/1994 | Funches et al. .......... 360/78.06 |
| 5,402,280 A | * | 3/1995 | Supino ..................... 360/77.04 |
| 5,404,253 A | * | 4/1995 | Painter ..................... 360/77.04 |
| 5,539,714 A | * | 7/1996 | Andrews, Jr. et al. ... 360/77.04 X |
| 5,585,976 A | * | 12/1996 | Pham .................. 360/78.09 X |

* cited by examiner

Primary Examiner—David Hudspeth
Assistant Examiner—K. Wong
(74) Attorney, Agent, or Firm—Crowe & Dunlevy

(57) ABSTRACT

Method and apparatus for reducing repeatable runout signals in a servo position error (SPE) signal of a disc drive actuator. During track following, a measurement estimate is obtained through the sampling and accumulating of data from the SPE over a mechanical revolution of the drive, the measurement estimate providing a characterization of the repeatable runout signal in the servo position error signal. A correction estimate is updated by the measurement estimate, and the correction estimate is added to the servo position error signal to provide an adjusted servo position error signal. The disc drive uses the adjusted servo position error signal to generate a correction signal for adjusting the position of the actuator. The measurement estimate is reset after each update of the correction estimate and a new measurement estimate is generated during each subsequent rotation of the disc drive during track following mode.

11 Claims, 4 Drawing Sheets

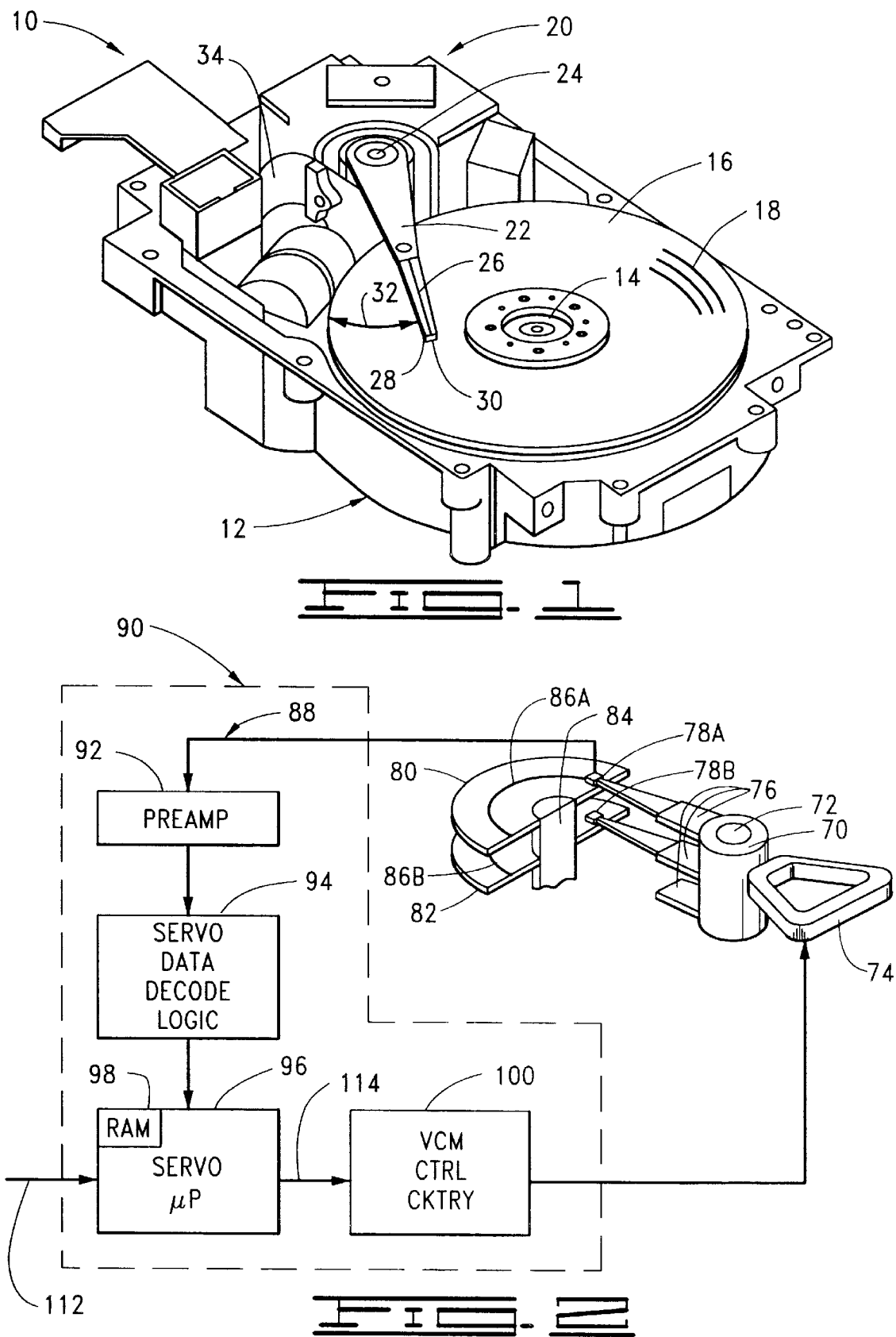

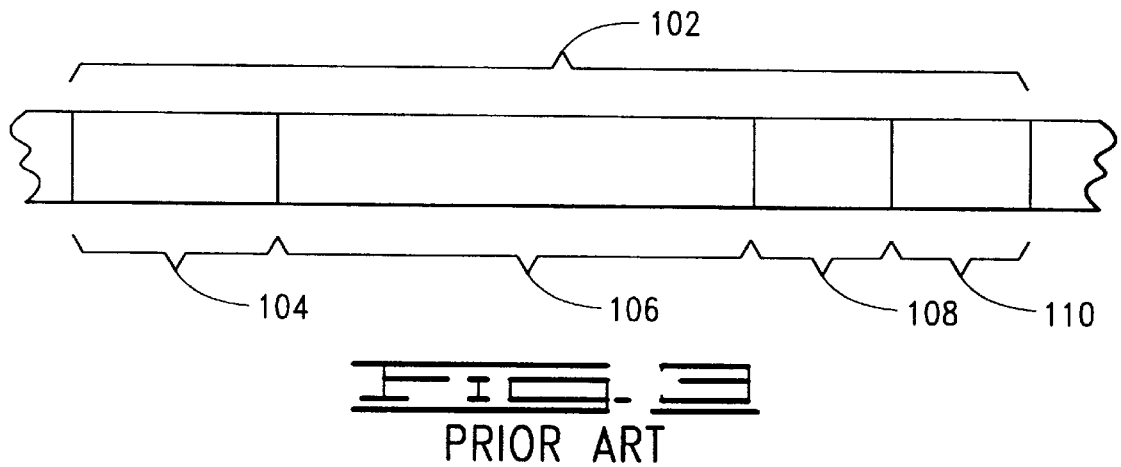
FIG. 3
PRIOR ART
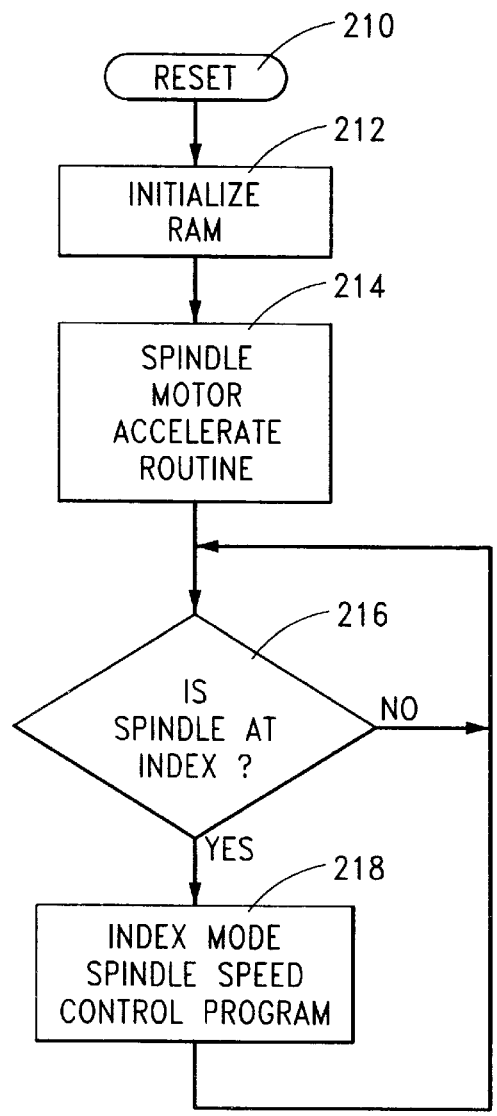
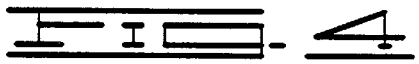
FIG. 4

FEED FORWARD COMPENSATION FOR REPEATABLE HEAD POSITION ERROR IN A DISC DRIVE

BACKGROUND OF THE INVENTION

1. Field of the Invention

This invention relates generally to the field of disc drive data storage devices, and more particularly, but not by way of limitation, to a method and apparatus for providing feed forward compensation to improve head positioning in a disc drive.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers, or heads (usually one per disc surface) mounted for movement to an electronically controlled actuator mechanism. The storing of information on the discs is referred to as "writing" and the subsequent retrieval of information from the discs is called "reading".

Presently, the most commonly used type of actuator mechanism is the rotary voice coil actuator, also referred to as a rotary moving-coil actuator. With this type of actuator, the transducers used to write and read data are mounted via flexures at the ends a plurality of head arms which project radially outward from a substantially cylindrical actuator body. The actuator body is journaled via ball bearing assemblies to rotate about a pivot shaft which is mounted to the disc drive housing at a position closely adjacent the outer extreme of the discs. The pivot shaft is intended to be in parallel with the axis of rotation of the spindle motor and the discs. The transducers will thus move in a plane parallel with the surfaces of the discs.

A coil is mounted on the side of the actuator body opposite the head arms so as to be immersed in the magnetic field of an array of permanent magnets which are in turn mounted to the disc drive housing. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Control of the movement of the heads is achieved with a closed loop servo system such as disclosed in U.S. Pat. No. 5,262,907 entitled HARD DISC DRIVE WITH IMPROVED SERVO SYSTEM, issued to Duffy, McKenzie, Heydari and Woods, assigned to the assignee of the present invention and incorporated herein by reference. In such a system, position or servo information is prerecorded on at least one surface of one of the discs. The servo system can be either a "dedicated" servo system, in which one entire disc surface is prerecorded with the servo information and a dedicated servo head is used to constantly read the servo information, or an "embedded" servo system, in which servo information is interleaved with user data and intermittently read by the same heads used to read and write the user data.

With either a dedicated or embedded servo system, it is common that the servo circuitry produce a servo/position error (SPE) signal which is indicative of the position of the head relative to the center of a track. The identity of the particular track, as well as other information relating to the circumferential position of the head on the track, is included, along with other information, in the prerecorded servo information. Thus, when the heads are following a desired track, the SPE will ideally have a zero value. The SPE is fed back to circuitry used to control current through the coil of the actuator and any tendency of the heads to deviate from true track center causes the SPE to change from its zero value accordingly.

It is known that the SPE can contain certain low frequency components as a result of defects in the disc drive; more particularly, if the disc is not centered precisely over the axis of rotation, the circular tracks may have an eccentric shape with respect to the axis of rotation. This will result in a low frequency component existing within the SPE at a frequency equal to the revolutions per second of the disc drive (for example, a 90 Hz signal will appear in an SPE plot for such a disc drive operating at 5400 revolutions per minute, or 90 revolutions per second). This low frequency component will comprise a repeatable runout (RRO) signal for which the servo system will continually make corrections, resulting in an oscillation of the heads at the RRO frequency as the discs move in relation to the actuators.

The effects of such RRO signals on disc drive performance are well known and the prior art discloses several approaches that have been taken to minimize these effects, including U.S. Pat. No. 4,594,622 issued to Wallis, which discloses integrating the actuator control signal from the transducer twice in order to generate a pseudo head position signal which is summed with the SPE. The resultant signal is then twice differentiated and the result is stored and subsequently combined with the actuator control signal. In this way, a corrected SPE signal is provided to the actuator in order to correct for the RRO signal.

Additionally, U.S. Pat. No. 4,616,276 issued to Workman discloses the calculation of a group of tap weights for a set of sine and cosine functions to generate a modified actuator control signal. The tap weight calculations converge to a final value in accordance with a convergence function as SPE sample values are provided from the actuator and each tap weight is multiplied by its appropriate sine or cosine function. The resultant products are summed to provide a correction signal which is combined with the SPE to provide the modified control signal to the actuator.

While the prior art has been operative, as spindle speeds continue to increase and track spacings on the discs continue to decrease, there remains a continual need for improved methods for minimizing the effects of the low frequency RRO component in an SPE signal in an efficient and effective manner.

SUMMARY OF THE INVENTION

The present invention provides an improved method and apparatus for minimizing the effects of repeatable runout (RRO) signals in an SPE in a disc drive. More particularly, the present invention provides a method and apparatus of a disc drive which obtains a measurement estimate through the sampling and accumulating of data from the SPE during track following over a mechanical revolution of the drive, the measurement estimate providing a characterization of the repeatable runout signal in the servo position error signal. A correction estimate is updated by the measurement estimate, and the correction estimate is added to the servo position error signal to provide an adjusted servo position error signal. The disc drive uses the adjusted servo position error signal to generate a correction signal for adjusting the position of the actuator. The measurement estimate is reset after each update of the correction estimate and a new measurement estimate is generated during each subsequent rotation of the disc drive during track following mode. A discrete fourier transform (DFT) is used in a preferred embodiment of the invention to obtain the measurement estimate.

An object of the present invention is to provide a method and apparatus for minimizing the effects of repeatable runout (RRO) signals in an SPE in a disc drive.

Another object of the present invention, while achieving the above stated object, is to provide a method and apparatus that characterizes the RRO signal during each mechanical rotation of the disc.

Still another object of the present invention, while achieving the above stated objects, is to generate a compensation signal that is updated by the characterized RRO signal.

Another object of the present invention, while achieving the above stated objects, is to use the compensation signal to generate an adjusted SPE signal which is used to correct the position of the actuator.

Yet another object of the present invention, while achieving the above stated objects, is to compensate for vibrations due to disc imbalance or off-center mounting and for such vibrations provided from adjacent disc drives.

Other objects, advantages and features of the present invention will be apparent from the following description when read in conjunction with the drawings and appended claims.

BRIEF DESCRIPTION OF THE DRAWINGS

FIG. 1 is a perspective view of a disc drive in which the present invention is particularly useful.

FIG. 2 is a block diagram of a servo system used to control the actuator of the disc drive of FIG. 1.

FIG. 3 is a diagrammatic representation of a single frame of servo information for the servo system of FIG. 2.

FIG. 4 is a flow diagram of the main microprogram executed by the servo microprocessor of the servo system of FIG. 2.

DESCRIPTION

Figure 5:
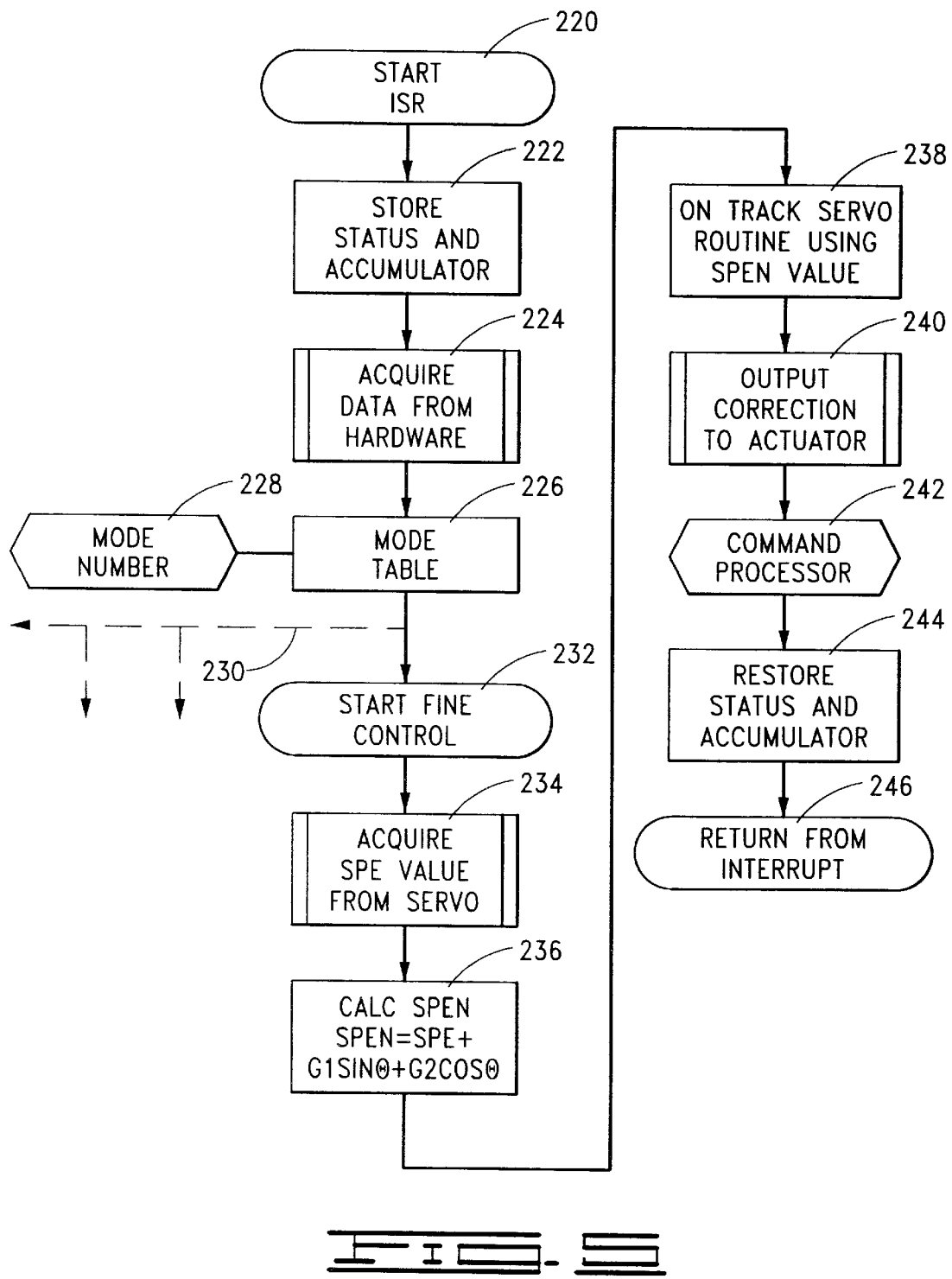
FIG. 5 is a flow diagram of the top level interrupt service routine (ISR) executed by the servo microprocessor of the servo system of FIG. 2.

Turning now to the drawings and more particularly to FIG. 1, shown is a perspective view of a disc drive 10 of the type in which the present invention is particularly useful. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14 using a disc clamp (not designated). In this example, the disc clamp is secured using screws (also not designated) equally spaced about the perimeter of the disc clamp. An array of heads (one shown at 30 ) is mounted via flexure assemblies 26 to an actuator body which is adapted for pivotal motion about a pivot shaft 24 under control of an actuator motor, shown generally at 20.

The actuator motor 20 is driven by electronic circuitry (not shown) to controllably move the heads 30 to any desired one of a plurality of concentric circular tracks 18 on the discs 16 along arcuate path 32. Signals used to control the actuator motor, as well as signals to and from the heads 30, are passed via a printed circuit cable 34.

Because the disc drive 10 illustrated in FIG. 1 includes the actuator motor 20 of the type known as a voice coil motor (VCM), or moving coil motor, the disc drive 10 must also include electronic control logic for moving the heads 30 to any one track 18, and maintaining the heads 30 closely adjacent the track for storing and retrieving data. This control logic is usually referred to as a servo system, and a typical servo system is shown in FIG. 2.

FIG. 2 is a simplified block diagram of the disc drive 10 of FIG. 1 servo system. Shown in FIG. 2 is an actuator body 70 which pivots about a pivot shaft 72 when drive current is applied to a coil 74 which lies between a pair of permanent magnets (not shown). On the opposite side of the actuator body 70 from the coil 74 is a plurality of head mounting arms 76 which in turn support a number of heads, two of which have been shown as 78A, 78B which are arrayed to cooperate with a stack of discs 80, 82 mounted for rotation on a spindle motor 84. While, in actual disc drives, there could be a larger number of discs, and a head associated with each disc surface, for purposes of clarity, only two discs 80, 82 and two heads 78A, 78B are shown.

For this and the following discussion, it will be assumed that the disc drive 10 of the present discussion employs a dedicated servo system, so that the top head 78A is a servo head and the top surface of the top disc 80 is a servo disc that contains prerecorded positional servo information. All other heads and discs will be referred to as "data heads" or "read/write heads" and "data discs", respectively. It will be recognized, however, that the present invention is not dependent upon the use of a particular type of servo system, and that the present invention could be utilized in a disc drive employing an embedded servo system.

As will be recognized, the basic principle of operation of the servo system is that, if the servo head 78A can be made to seek to and follow a given servo track 86A on the servo disc 80, all data heads 78B will simultaneously seek to and follow corresponding data tracks 86B. To facilitate this seeking and track following, servo data 88 read from the servo disc 80 is directed into a servo loop 90 which consists of a preamplifier 92, servo data decode logic 94 which includes an analog-to-digital (A/D) converter (not separately shown), a servo microprocessor 96 with associated RAM 98 and a VCM control circuit 100, which includes a power amp and a digital-to-analog (D/A) converter (both of which are not separately shown). A detailed description of the servo loop 90 can be found in the previously incorporated Duffy et al. reference, U.S. Pat. No. 5,262,907. Before continuing with this discussion, it will be helpful at this time to describe the format of the servo information prerecorded on the servo disc 80.

As will be recognized by those skilled in the art, the servo information on the servo disc 80 is recorded at the time of manufacture using a highly precise servo writer. Servo tracks correspond to the locations of data tracks on the other disc surfaces and each servo track is divided circumferentially into a fixed number of frames, and the format of one such servo frame is shown in FIG. 3. As shown in FIG. 3, each frame 102 is further divided into four separate fields, specifically an address field 104, a position field 106, a sector field 108, and a sync field 110. The function of the address field 104 is to provide a track address; that is, to define the approximate radial position of the head when the address field 104 is read. The position field 106 is used to define the exact radial position of the servo head relative to the servo track. The sector field 108 is encoded with information defining the circumferential position of the disc relative to the head, and the sync field 110 is used to aid in the development of timing signals. There will be about 265 of these frames 102 per track if the discs 80, 82 are rotating at 5400 RPM, and about 200 frames if the discs 80, 82 are rotating at 7200 RPM. Furthermore, the final sync field 110 of the final frame 102 contains special coding to define the beginning of each track and allow the generation of an index signal, which signifies the beginning of each mechanical revolution of the disc.

Referring now to FIGS. 2 and 3, the servo microprocessor 96 runs a loop program waiting for the servo data decode logic 94 to generate the index signal. At specifically timed intervals during the time the servo frame 102 passes under the servo head 78A, an interrupt is sent to the servo microprocessor 96 and the information in the servo frame 102 is read by the servo microprocessor 96, thus keeping the servo microprocessor 96 constantly aware of the radial and circumferential position of the servo head 78A and, therefore, the data heads 78B as well. The use that the servo microprocessor 96 makes of this information depends on the operational mode of the disc drive at the time of the interrupt. That is, if the disc drive is in a track following mode, the servo loop 90 simply decodes the information in the servo frame 102 to maintain the servo head 78A centered on the current track. If, however, the servo microprocessor 96 has received a command to seek from the current track to another track on command path 112, the servo microprocessor 96 sends a digital value on signal path 114 which causes the VCM control circuitry 100 to apply a controlled DC voltage of the proper polarity to begin moving the actuator in a controlled manner to the desired track. The specifics of track following and seeking are described in more detail in the previously incorporated Duffy et al. reference U.S. Pat. No. 5,262,907, as well as U.S. Pat. No. 5,305,160 entitled COMPENSATING FOR VARIATIONS IN TORQUE CAPABILITY OF VOICE COIL MOTORS, issued to Funches, Hampshire and Kovner, assigned to the assignee of the present invention and incorporated herein by reference.

FIG. 4 provides a simplified flow chart of the main program executed by the servo microprocessor 96 shown in FIG. 2. The servo microprocessor 96 is reset at power on in step 210, initializing the hardware and setting it to a desired known condition. The servo microprocessor RAM 98 is initialized at step 212, and the servo microprocessor 96 then enters a routine to accelerate the spindle motor from rest to its specified operating speed in step 214. Once the spindle motor has reached its nominal operating speed, the servo microprocessor 96 enters the simple loop program described above, in which it checks for the index signal to be decoded by the servo data decode logic 94 in decision block 216, and when an index has been detected, it runs an index mode spindle speed control program at step 218 to maintain the spindle motor at the desired speed. All other operations of the servo microprocessor are accomplished through the use of interrupts (one per servo frame) to the servo microprocessor 96.

FIG. 5 shows a portion of the main interrupt service routine (ISR) for the servo microprocessor 96. It will be understood that this is not a comprehensive flow chart for all functions performed by the servo microprocessor 96, but it does summarize the functions that the servo microprocessor 96 performs in the implementation of the present invention. For reference, the previously incorporated Funches et al. reference U.S. Pat. No. 5,305,160 and Duffy et al. U.S. Pat. No. 5,262,907 provide additional detail concerning operations performed by the servo microprocessor 96, including seeks, calibrations, and track verification.

Before continuing with a detailed discussion of the ISR shown in FIG. 5, it will be helpful to first describe the general operation of the servo control loop in implementing the present invention, which is an improved approach to eliminating the effects of repeatable run out (RRO) signals in the SPE. That is, the preferred embodiment of the present invention describes an implementation whereby a sinusoidal RRO signal existent in the SPE is cancelled out by characterizing the RRO signal and then injecting a correction signal into the SPE to compensate for this RRO signal, generating a new SPE signal (denoted hereinbelow as "SPEN"). The servo loop then proceeds to correct the position of the actuator using the SPEN value.

More particularly, once the disc drive 10 of FIG. 1 begins track following, wherein the actuator is instructed to follow a selected track (such as at the end of a seek), a signal measurement routine is initiated at the next index and, during the subsequent rotation of the disc drive, the RRO signal is characterized in terms of sine and cosine functions. In the preferred embodiment, as explained below a discrete fourier transform (DFT) is performed so as to provide a characterization estimate of the signal. At the next index, this estimate is provided to a signal generation routine which generates the SPEN signal used by the servo loop to correct the position of the actuator. Meanwhile, the measurement routine is reset so that a new characterization estimate is made during the next rotation of the disc drive, and at the end of the next rotation (next index), this new estimate is used to update the signal generation routine. The correction signal applied to the actuator is thus improved at each index.

At some point during this operation, the measured RRO in the SPE will approach zero as the correction signal provided by the signal generation routine compensates for the RRO and effectively removes it from the SPE. When a seek takes place, so that the actuator moves to a new destination track, the previously obtained value by the signal generation routine continues to be used to determine the SPEN signal and, at the first index, the measurement routine again begins to sample and accumulate data from the SPE. At the second index, the characterization obtained from the measurement routine is used to update the signal generation routine, and this process continues as before.

Having concluded an overview, the steps performed in accordance with the preferred embodiment of the present invention will now be discussed. FIG. 5 shows the interrupt service routine executed by the servo processor to be started at a block numbered 220. The servo microprocessor 96 contains an accumulator which is the working register for mathematical and logical operations and a status register which defines several internal conditions for the program being executed. Because the servo microprocessor 96 does not automatically store the accumulator and status register in response to an interrupt, the accumulator and status registers are saved as a first step 222 in the ISR. Next, several different types of information, such as the track address, actuator drive current, servo position error (SPE), presence of index, etc. are collected from the servo system and stored in the servo microprocessor RAM 98 at step 224. At this time, the specific interrupt to be serviced has not been identified and it is faster to simply store this information for every interrupt than to determine the reason for the interrupt and then collect the data necessary to service the interrupt. The ISR then selects the starting address of the proper service routine from a mode table at step 226, based on a mode number supplied by the block 228. This mode number may be determined by the previously executed interrupt routine, or preset at power up.

It will be understood that a number of different modes may be selected by the flow of FIG. 5 at this point (as shown by a branching arrow 230 ), and the references incorporated herein provide particular details concerning these different modes. However, for purposes of clarity, only the FINE CONTROL mode as disclosed herein will be presented, as the preferred embodiment of the present invention is implemented during FINE CONTROL.

The FINE CONTROL mode, or track following mode, is selected by the mode table 226 and is initialized as denoted by block 232, START FINE CONTROL. The flow continues to block 234, wherein the SPE value obtained in block 224 from the servo frame of FIG. 3 is acquired and used in block 236 to calculate the SPEN value in accordance with the following equation:

$$SPEN = SPE + (G1)(\sin\theta) + (G2)(\cos\theta) \quad (1)$$

with SPE being the value obtained in block 234, G1 and G2 being values representing a measurement estimate of the RRO, and $\theta$ being the angle of rotation of the disc. The generation of the G1 and G2 values as well as the sine and cosine values will be discussed in more detail below, but for now it will be sufficient to state that G1 and G2 serve to reflect the measurement made of the RRO signal in the SPE in a previous rotation of the disc. On power up of the disc, for the first pass through the FINE CONTROL mode, these G1 and G2 values can be initially set to 0 or set to some values that were previously saved in nonvolatile memory. As shown below, the values G1 and G2 will be updated on subsequent rotations of the disc.

Figure 6:
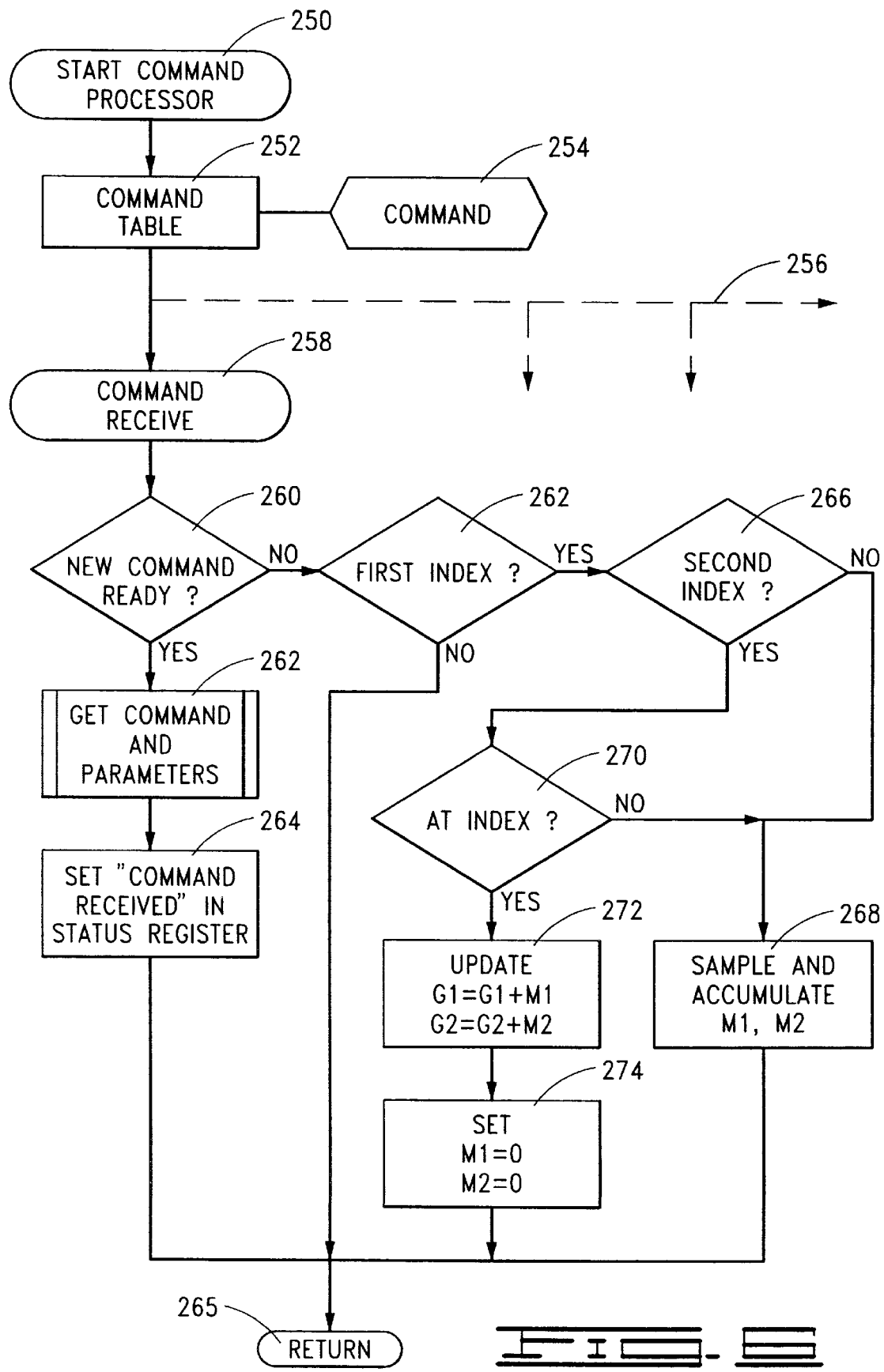
FIG. 6 is a flow diagram of a command processor routine, which is a second level portion of the interrupt service routine executed by the servo microprocessor of the servo system of FIG. 2.

The flow of FIG. 5 continues after the calculation of the SPEN value to block 238, which is an ON TRACK SERVO ROUTINE that uses the SPEN value to determine a correction factor which is output by block 240 to correct the position of the actuator. It will be recognized that the operation of blocks 238 and 240 is conventional with the exception that the SPEN value, instead of the SPE value, is used to determine the correction factor. The flow then continues to a COMMAND PROCESSOR block 242, which is a secondary routine used by the ISR of FIG. 5, the relevant portions of which are illustrated in FIG. 6, to be discussed below. After the COMMAND PROCESSOR routine is completed, program flow returns to a RESTORE STATUS AND ACCUMULATOR step 244 and then returns to the program of FIG. 4 at block 246.

Having concluded a description of the ISR of FIG. 5, the COMMAND PROCESSOR will now be discussed. The operation of the COMMAND PROCESSOR shown in the flow diagram of FIG. 6 is only a partial flowchart of all the options that may be executed by the COMMAND PROCESSOR, but includes the choices necessary to discuss the present invention. The flow chart begins at step 250, and the subsequent path for the interrupt service is determined by selecting a starting address for the next program to be executed from a COMMAND TABLE at step 252. The specific address to be selected is determined by the COMMAND block 254. Once again, the COMMAND may be selected by a previously executed Command Process, or preset to a default value at power on. The broken line 256 indicates the presence of other command paths that may be selected at this time by the COMMAND TABLE 252, and the above incorporated references provide additional disclosure concerning these other command paths. For purposes of describing the preferred embodiment, however, the COMMAND block 254 selects the starting address of the COMMAND RECEIVE routine which begins at block 258. The COMMAND RECEIVE routine first checks to see if a command has been received from the system microprocessor (not shown), as shown by decision block 260. If so, the flow continues to block 262 wherein the command and associated parameters are obtained and a "COMMAND RECEIVED" status is set in the status register, at block 264 and program flow returns to the ISR of FIG. 5 (as shown by RETURN block 265).

When during the flow of FIG. 6 that the COMMAND RECEIVE block 258 determines that a new command is not ready, as shown by the decision block of 260, program flow continues to a next decision block 262, which determines if a first index has been detected. It should be recalled that the present invention is used during track following, and that a disc drive will generally be in a track following mode unless instructed to perform a specific operation such as a seek. Once the FINE CONTROL mode has been initiated (either initially after power on or at the conclusion of a seek), the servo actuator will continue to follow the selected track and indicate when, during such track following, an index is detected (each index indicating one revolution of the disc). Thus, because the initialization of FINE CONTROL will seldom coincide exactly with the occurrence of an index pulse, there will generally be a portion of disc rotation that will occur after the FINE CONTROL has been initiated before the first index pulse is received by the servo loop. It should be noted that the COMMAND PROCESSOR flow of FIG. 6 distinguishes between three different conditions, the first condition being before the first index has been received, the second being after the first index but before the second index, and the third being after the second index. The purpose for these distinctions will be explained more fully below.

Continuing with FIG. 6, decision block 262 determines whether this first index pulse has been received, and if not, exits the command processor at the RETURN block 265. At such time that the first index is received (and thereafter) the decision block 262 passes flow to decision block 266, which determines whether the second index has been received. If not, this indicates that the FINE CONTROL mode of operation is somewhere between the first and second indices and program flow continues to block 268, wherein characterization values M1 and M2 are generated by way of a sample and accumulate operation. The generation of characterization values M1 and M2 will be discussed in more detail below, but in the preferred embodiment M1 and M2 are determined using a DFT using 66 samples over a complete rotation of the disc (from index to index). Once the sample and accumulate step is performed, program flow returns to the ISR of FIG. 5.

At such time that the decision block 266 determines that both the first and second indices have been received, program flow passes to a third decision block 270, which determines whether an index is present. It will be recognized that upon receipt of the second index, program flow will thereafter proceed to this block. When decision block 270 determines that an index pulse is present, program flow will continue to UPDATE block 272, wherein the G1 and G2 values described above with reference to block 236 of FIG. 5 are updated in accordance with the following equations:

$$G1 = G1 + M1 \quad (2)$$

$$G2 = G2 + M2 \quad (3)$$

so that the values M1 and M2 accumulated during the period before the index are added to the G1 and G2 values. Thereafter, the M1 and M2 values are reset to 0 as shown in block 274 and program flow returns through block 265 to the ISR of FIG. 5.

Likewise, at such times that the decision block 270 determines that an index pulse is not present, program flow passes to the SAMPLE AND ACCUMULATE block 268, wherein the values M1 and M2 are determined. Thus, it will be recognized by the foregoing description that the values M1 and M2 are generated during periods between index pulses, and at each subsequent index pulse the values M1 and M2 are used to update the G1 and G2 values, which are then used to add a correction signal to the actuator during the next index period. Additionally, the M1 and M2 values are reset to 0 and regenerated during the next index period in order to measure the effects of the updated G1 and G2 values upon the SPE signal. It will be clear that over a number of revolutions the G1 and G2 values will provide a correction signal that essentially cancels out the RRO signal in the SPE and the M1 and M2 values obtained during each revolution will tend to converge towards 0.

Having concluded a discussion of the operation of the servo loop 90 of FIG. 2, the present discussion will now turn to the SAMPLE AND ACCUMULATE RESONANCE DATA operation as described hereinabove with reference to block 268 of FIG. 6. A discrete fourier transform (DFT) has been found to be particularly useful in detecting and characterizing an RRO signal in the SPE. As will be recognized by those skilled in the art, a DFT is a sampling methodology that involves the accumulation of the following values:

$$M1 = (2/N) \sum_N (SPE(n))(\sin\theta) \quad (4)$$

$$M2 = (2/N) \sum_N (SPE(n))(\cos\theta) \quad (5)$$

where

N=number of samples over which DFT is taken n=nth sample

SPE(n)=value of SPE at sample n

θ=angle of rotation with respect to index, from 0 to 360 degrees.

The angle θ can also be represented by the expression 2πfnT, with f being the frequency of the RRO and T being the sample period. By selecting the number of samples n to be taken, the values M1 and M2 above can thus be determined by sampling and accumulating these sums over each rotation of the disc. It will be noted that the foregoing description of the present invention including the use of a DFT is by way of example rather than of limitation, in that it will be recognized that there are other possible data manipulation methodologies available that could be used over one revolution of the disc to implement the sample and accumulate portion of the method of the present invention.

A DFT using 66 samples per revolution is used in the preferred embodiment for the sample and accumulation operation of block 268 in FIG. 6. As provided hereinabove, for a spindle speed of 5400 revolutions per minute, a total of 265 servo frames (102 in FIG. 3) are provided in one revolution, each servo frame providing an SPE value. Thus, not every SPE value provided in a rotation need be sampled for the sample and accumulate operation of block 268. It will also be recognized that groups of successive SPE values (such as every four) can be averaged, and the averages provided to the SAMPLE AND ACCUMULATE block 268 as the sample SPE values.

It will now be understood that, during operation of the servo loop of FIG. 2 in accordance with the program flows of FIGS. 4, 5 and 6, the SAMPLE AND ACCUMULATE block 268 of FIG. 6 serves to provide a characterization estimate of the RRO in the SPE signal in terms of the values M1 and M2. At each index, these M1 and M2 values are added to the signal generation values G1 and G2 in the UPDATE block 272 of FIG. 6, so that the G1 and G2 values are updated at each revolution. The values G1 and G2 are used by the CALC SPEN block 236 of FIG. 5 on each pass through the ISR (every servo frame) to modify the measured SPE value to generate the SPEN value, which is subsequently used by the ON TRACK SERVO ROUTINE block 238 to provide the correction signal to the actuator.

It will be recalled that the SPEN value is obtained in accordance with equation (1) above, which requires the sine and cosine values of the angle of rotation θ. The present invention contemplates the use of a conventional sine/cosine table (not shown) in order to provide the required sine and cosine values. This table, which can be loaded into the RAM 98 of the servo microprocessor 96 of FIG. 2 during initialization, contains a digital representation of a sinusoidal waveform over 1 and ¼ cycles (450 degrees). The table includes a sine pointer and a cosine pointer, both of which continuously loop through the waveform during operation, allowing continuous sinusoidal value outputs to be provided as required for the calculation of the SPEN values. In the preferred embodiment, the table contains 66 sample points per cycle and begins at 0 degrees. Thus, values representing sin θ and cos θ can be obtained and provided to the CALC SPEN block 236 in order to carry out the function of determining each SPEN value in accordance with equation (1). For more discussion of the sine/cosine table, reference can be made to U.S. Pat. No. 5,654,841 entitled DETECTION OF MECHANICAL DEFECTS IN A DISC DRIVE USING INJECTED TEST SIGNALS, issue Aug. 5, 1997 to Hobson, Felts and Hampshire, assigned to the assignee of the present invention and incorporated herein by reference.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive having a disc and an actuator adjacent the disc, the disc having a plurality of nominally concentric tracks, the disc drive providing a servo position error signal indicative of the position of the actuator relative to a selected track, the disc drive further providing a correction signal to adjust the position of the actuator with respect to the selected track in response to the servo position error signal, the disc drive comprising:

measurement means for sampling and accumulating data from the servo position error signal over a first complete disc revolution to provide a measurement estimate, the measurement estimate characterizing a repeatable runout signal in the servo position error signal;

means for providing a correction estimate;

updating means, responsive to the measurement means, for updating the correction estimate with the measurement estimate at the end of the first complete disc revolution to generate an updated correction estimate;

summing means, responsive to the updating means, for adding the updated correction estimate to the servo position error signal to provide an adjusted servo position error signal over a second complete disc revolution; and correction means, responsive to the summing means, for determining the correction signal in relation to the adjusted servo position error signal.

2. The disc drive of claim 1, wherein the measurement means further comprises reset means for resetting the measurement estimate at the end of each disc revolution after the updating means updates the correction estimate.

3. The disc drive of claim 2, wherein the disc drive further comprises nonvolatile memory means for providing and storing the correction estimate.

4. The disc drive of claim 3, wherein the measurement means is not enabled until a first index is received, indicating the start of the first complete disc revolution.

5. In a disc drive having a disc and an actuator adjacent the disc, the disc having a plurality of nominally concentric tracks, the disc drive providing a servo position error signal indicative of the position of the actuator relative to a selected track, the disc drive further providing a correction signal to adjust the relative position of the actuator with respect to the selected track, a method for reducing repeatable runout signals in the servo position error signal comprising the steps of:

sampling and accumulating data from the servo position error signal over a first complete disc revolution to provide a measurement estimate, the measurement estimate characterizing a repeatable runout signal in the servo position error signal;

providing a correction estimate;

updating the correction estimate with the measurement estimate at the end of the first complete disc revolution;

adding the correction estimate to the servo position error signal to provide an adjusted servo position error signal; and using the adjusted servo position error signal to correct the position of the actuator.

6. The method of claim 5, wherein the step of sampling and accumulating data further comprises the step of resetting the measurement estimate at the end of each disc revolution after the step of updating the correction estimate.

7. The method of claim 6, wherein the disc drive further comprises memory and the step of providing a correction estimate comprises the steps of storing an initialized value for the correction estimate in the memory and, thereafter, storing and providing the updated correction estimate.

8. The method of claim 7, wherein the step of sampling and accumulating data begins upon receipt of a first index, indicating the beginning of the first complete disc revolution.

9. In a disc drive having a rotatable disc and an actuator adjacent the disc, the disc having a plurality of nominally concentric tracks, the disc drive generating a position error signal from servo data stored on the disc, the position error signal indicative of the relative position of the actuator to a selected track, the disc drive further generating correction signals from the servo position error signal to adjust the position of the actuator relative to the selected track, a method for reducing repeatable runout signals in the position error signal during a track following mode of operation, the method comprising the steps of:

over a first complete revolution of the disc,
generating a position error signal from selected servo data on the disc;
using the position error signal to adjust the position of the actuator; and
sampling and accumulating data from the position error signal to generate a measurement estimate, the measurement estimate characterizing a repeatable runout signal in the position error signal;

at the end of the first complete revolution of the disc,
providing a correction estimate; and
updating the correction estimate with the measurement estimate;

over each subsequent complete revolution of the disc,
adding the correction estimate to the position error signal to generate a compensated position error signal;
using the compensated position error signal to adjust the position of the actuator; and
sampling and accumulating data from the compensated position error signal to generate a new measurement estimate, the new measurement estimate characterizing a repeatable runout signal in the compensated position error signal; and at the end of each subsequent complete revolution of the disc,
updating the correction estimate with the new measurement estimate.

10. The method of claim 9, wherein the position error signal is generated as a plurality of samples obtained over each revolution of the disc, and wherein the steps of sampling and accumulating data comprise the step of performing a discrete fourier transform upon the plurality of samples.

11. The method of claim 10, wherein the steps of sampling and accumulating data further comprise determining averages of successive samples in the plurality of samples and performing the discrete fourier transform upon the averages.

* * * * *

UNITED STATES PATENT AND TRADEMARK OFFICE
CERTIFICATE OF CORRECTION

PATENT NO.   : 6,456,452 B1  Page 1 of 1
DATED        : September 24, 2002
INVENTOR(S)  : Hobson et al.

It is certified that error appears in the above-identified patent and that said Letters Patent is hereby corrected as shown below:

<u>Title page,</u>
Insert -- [*] Notice: Under 35 U.S.C. 154(b), the term of this patent shall be extended for 1290 days. --.

Signed and Sealed this

Sixth Day of May, 2003

JAMES E. ROGAN
*Director of the United States Patent and Trademark Office*